March 14, 1961  W. J. PLORAN  2,975,312
LAMINATED MAGNETO COMPONENTS
Filed March 7, 1958

INVENTOR.
William J. Ploran
BY Chapin & Neal
ATTORNEYS

United States Patent Office 2,975,312
Patented Mar. 14, 1961

2,975,312
LAMINATED MAGNETO COMPONENTS

William J. Ploran, Willimansett, Mass., assignor to Globe-Union Inc., Milwaukee, Wis., a corporation of Delaware Filed Mar. 7, 1958, Ser. No. 719,926

1 Claim. (Cl. 310—217)

The present invention relates to laminated magneto components and their manufacture.

As herein disclosed, it will be seen that the present inventive concepts have particular utility in the manufacture of field magnet units of the type described in U.S. Patent 2,756,356, Brownlee. These units comprise a plurality of stacked laminations, each of which includes a pair of pole shoe pieces interconnected by a relatively thin bridge. The stacked laminations compositely provide a seat for receiving a permanent magnetic block of alnico or the like. These laminations are secured together into pole shoe groups by separate fastening elements, such as a pair of rivets, and are provided with positioning holes for receiving locating pins in the mold for die casting a fly wheel housing. After the fly wheel housing has been cast with the field magnet unit incorporated therein, the interconnecting bridges between the shoe pole pieces are removed to provide two separate units of shoe pole pieces.

It is a general object of this invention to minimize the cost of laminated magneto components, as pole shoe groups, by providing a novel stacked group of laminations secured together without the need of a separate fastening element.

Another object of the invention is to provide a novel method of attaining the above end.

The invention is characterized by the first lamination of a group being formed with a hole of a given outline therethrough and a second lamination having a projection extending from one side and an aligned recess on its opposite side, said projection and recess also having the same outlines as the hole in the first lamination. The projection of the second lamination is extended into the opening in the first lamination to secure the two laminations together. Other laminations having projections and recesses identical with that of the second lamination, are disposed in stacked relation on the first two laminations with the projection of each extending into the recess of the adjacent element to hold all of the laminations together in a stacked group without the need of a separate fastening element.

The above and other related objects and features of the invention will be apparent from a reading of the following description of the disclosure found in the accompanying drawing and the particular novelty thereof pointed out in the appended claim.

Figure 1:
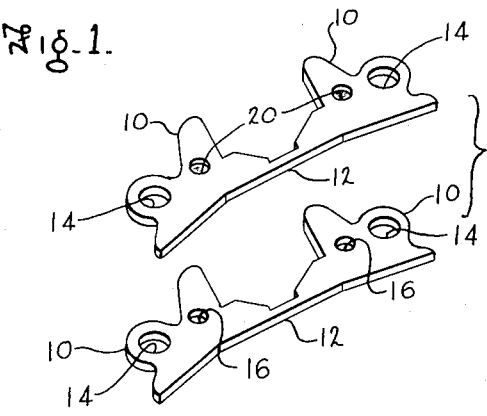
Fig. 1 is a perspective view of the first and second laminations of a stacked group.

For illustrative purposes, the drawing illustrates the manufacture of pole shoe groups which are used to provide the field magnet unit for magnetos. It will, of course, be appreciated that other laminated magneto components may also be advantageously formed in accordance with the present invention.

In Fig. 1 there will be seen the first two laminations of a stacked group of pole shoe laminations. Each lamination comprises a pair of pole shoe pieces 10 interconnected by a relatively thin bridge 12. In each pole shoe piece 10 there is formed a positioning hole 14 for receiving locating pins in the mold of the die casting machine used to make the fly wheel housings in which the field magnet unit is to be incorporated.

The lowermost or first lamination of a group is formed with a hole 16 extending through each pole shoe piece 10. The second lamination which is to be stacked thereon is formed with an integral projection 18 extending from the lowermost surface of each pole shoe piece 10 and a recess 20 in the upper surface aligned with each projection (see Fig. 2). The projection 18 is formed with an outline which is the same as the outline of the hole 16 and the outline of the recess 20 is likewise formed with this same identical outline. That is, as close as manufacturing tolerances permit, if the diameter of the hole 16 is .250", then the diameter of the recess 20 should also be exactly .250". It is also preferable that this dimension be maintained throughout the length and depth of the projection 18 and the recess 20 respectively, i.e. the base of the projection 18 should be an extremely sharp 90° angle and the same is true of the bottom of the recess 20. Another preferable relationship is found in the depth of the recesses 20 which approximate half the thickness of the lamination material.

Figure 2:
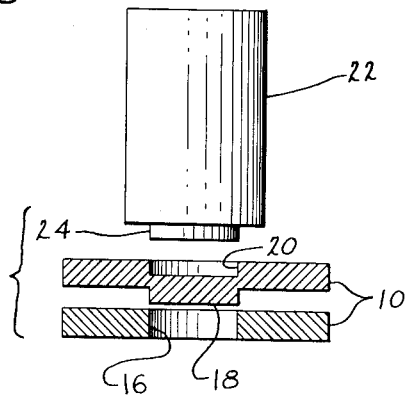
Fig. 2 is a view in section illustrating the first two laminations positioned preparatory to being secured together.

The first two laminations are positioned with the projections 18 aligned with the holes 16 as illustrated in Fig. 2 and the projections 18 are then forced into the holes 16. It has been found preferable that when forcing the projections 18 into the holes 16, that pressure be applied to the bottoms of the recesses 20 as well as to the upper surface of the lamination in the area adjacent said recess. This may be done by using a punch 22 having a projection 24 on its bottom surface which is substantially the same length as the depth of the recess 20. A blow with a hammer will force the projection 18 into the hole 16 securing the two laminations together in the manner seen in Fig. 4.

Figure 4:
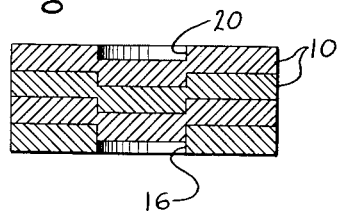
Fig. 4 is a section similar to that of Fig. 2 showing a plurality of laminations secured together according to the present invention.

Other laminations in the stacked group are formed in the same fashion as the second lamination above-described, each having identical projections 18 and recesses 20. The projections 18 of the further laminations are forced into the recesses 20 of the next adjacent lamination, again by preferably using the illustrated punch 22. This assembled relation is also seen in Fig. 4.

Figure 3:
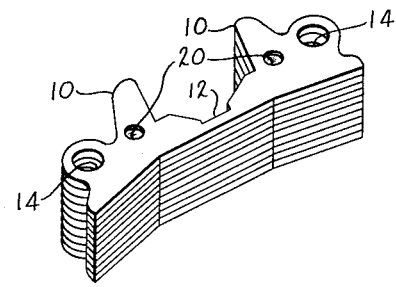
Fig. 3 is a perspective view of a completed stacked group of laminations.

A completed group of laminations is seen in Fig. 3 which group is secured together solely by the above-described punched projections 18. Sufficient holding power is provided in this manner to permit the pole shoe groups to be handled in the same relatively rough fashion as prior groups which were secured together with rivets or screws. It will be apparent that the described pole shoe group is much more economical to form in that the need for separate fastening elements has been eliminated, with great resultant economy in eliminating the expense of such fastening elements, as well as the cost of inserting and securing them. It will also be noted that the illustrated stacked group has itself no projections extending from its upper and lower surfaces, thus, for example, a plurality of groups may be more easily disposed in stacked relation for automatic handling, where such is desired.

Having thus described the invention, what is claimed as novel and desired to be secured by Letters Patent of the United States is:

A laminated pole shoe group comprising a stack of flat laminations wherein each lamination includes a pair of pole shoe pieces interconnected by a thin bridge, one of said laminations having a hole through each pole shoe piece, said holes having the same circular outline throughout their lengths, a second lamination stacked thereon and having projections extending from said pole shoe pieces and spaced apart the same distance as said holes, and a recess aligned with each of said projections on the opposite side of a second lamination, the projections of the second lamination extending into the holes in the first lamination a distance less than the thickness of the first lamination to frictionally secure the two laminations together and further laminations disposed in stacked and aligned relation on the second lamination, each of said further laminations having projections and recesses on their pole shoe pieces with the projections and recesses having the same dimensions as and being spaced apart the same distance as the projections and recesses of the second lamination, the projections of the further laminations extending into the recesses of the adjacent lamination to frictionally secure the laminations together.

References Cited in the file of this patent

UNITED STATES PATENTS

| | | |
|---|---|---|
| 642,599 | Geisenhoner | Feb. 6, 1900 |
| 1,252,289 | Murray | Jan. 1, 1918 |
| 1,286,013 | Jeannin | Nov. 26, 1918 |
| 1,812,151 | Jacocks | June 30, 1931 |
| 2,870,533 | Benham | Jan. 27, 1959 |

FOREIGN PATENTS

| | | |
|---|---|---|
| 872,779 | France | Feb. 23, 1942 |
| 767,443 | Germany | Aug. 14, 1952 |